United States Patent
Meed

[15] 3,689,842
[45] Sept. 5, 1972

[54] ELECTRONIC MARKER MARINE

[72] Inventor: Marcus J. Meed, 389 Main St., Ottawa, Ontario, Canada

[22] Filed: Sept. 23, 1970

[21] Appl. No.: 74,819

Related U.S. Application Data

[63] Continuation-in-part of Ser. No. 758,398, Sept. 9, 1968.

[52] U.S. Cl. ................................. 325/114, 325/116
[51] Int. Cl. ................................................ H04b 1/02
[58] Field of Search ................... 325/111, 113–116, 325/119; 89/115 C

[56] References Cited

UNITED STATES PATENTS

| | | | |
|---|---|---|---|
| 2,470,120 | 5/1949 | Walker | 89/1.5 C |
| 2,448,713 | 9/1948 | Hansell | 325/116 |

*Primary Examiner*—Robert L. Griffin
*Assistant Examiner*—Barry L. Leibowitz
*Attorney*—Stevens, Davis, Miller & Mosher

[57] ABSTRACT

A marker for marking the instantaneous position of an aircraft relative to the ground, more particularly over water, in the form of a protective casing containing a transmitter and an antenna which even in use remains inside the casing, the transmitter and the antenna both in themselves and by their mounting in the casing being able to withstand the acceleration forces involved in their being ejected from the aircraft with a velocity component in the direction opposite to that in which the aircraft is travelling substantially equal to the forward speed of the aircraft. The marker is thus brought to rest relative to the ground (as regards horizontal movement) as it leaves the aircraft.

10 Claims, 6 Drawing Figures

ELECTRONIC MARKER MARINE

This application is a continuation-in-part of my patent application Ser. No. 758,398 filed Sept. 9, 1968.

This invention relates to markers capable of providing an indication of their position.

Markers are sometimes used to mark a reference position on land or water for navigation purposes or to mark the path taken by a vessel. Marine marking devices (often called Markers marine) are sometimes dropped from an aircraft to mark successive positions of a submarine in the sea below the aircraft. In this way the course taken by the submarine can be marked and its future position at a particular time can be calculated.

With previously known markers, for example marking devices such as radio buoys, and in some cases visual markers, it has often been extremely difficult to drop the marker from an aircraft so that it accurately marked the position of a submarine. Radio buoys, for example, have a pronounced trajectory when dropped from an aircraft. Therefore they would often land some distance from their intended spot and perhaps to one side or the other of the submarine's course. Also under conditions of poor visibility, high wind velocity, rain or non-contrasting background it is, of course, very impractical to use a visual-type marker.

I have invented a marker which is capable of use so as to have a less pronounced trajectory and thus to more accurately mark the position of an object, for example a submarine, by providing an indication of the marker's position.

Aircraft are often provided with retro-ejector equipment for various purposes. I therefore propose to construct a marker so that it can be fired from an aircraft's retro-ejector equipment without appreciable damage and which will be capable of indicating its position even in conditions of poor visibility. The retro-ejector should ideally fire the marker backwards at the forward speed of the aircraft so that the resultant path followed by the marker can be accurately predicted so that it marks the position of a submarine with greater accuracy. Difficulties would normally be experienced in designing a satisfactory marker for firing from a retro-ejector due to the electronic equipment it must include, but I have discovered that these difficulties can be overcome by utilizing a particular transmitter and by providing an antenna within the housing and capable of transmitting a signal to the exterior of the housing. By designing the transmitter to be capable of operating in a particular range of frequencies additional advantages are obtained.

According to one aspect of the present invention, means for marking the instantaneous position of an aircraft relative to the ground comprises a buoyant marker including a radio transmitter adapted to produce a signal which can be used by ratio direction finders to ascertain the position of the marker and an antenna system adapted to transmit that signal, the transmitter and the antenna both being mounted inside, and in operation remaining inside, a protective casing and being adapted both in themselves and by their mounting in that casing to be capable of withstanding the acceleration forces involved in their being projected from the aircraft with a velocity component in the direction opposite to that in which the aircraft is travelling substantially equal to the forward speed of the aircraft.

According to another aspect of the invention, means for marking the instantaneous position of an aircraft relative to the ground comprises a buoyant marker and marker projecting means carried by the aircraft, the projecting means being directed to project the marker from the aircraft with a velocity component in the direction opposite to that in which the aircraft is travelling substantially equal to the forward speed of the aircraft, and the marker including a radio transmitter adapted to produce a signal which can be used by direction finders to ascertain the position of the marker and an antenna system adapted to transmit that signal, the transmitter and the antenna both being mounted inside, and in operation remaining inside, a protective casing and being adapted both in themselves and by their mounting in that casing to be capable of withstanding the acceleration forces involved in their being projected from the aircraft.

According to a further aspect of the invention means for marking the instantaneous position of an aircraft comprising a buoyant marker for transmitting a signal which can be used by radio direction finders to ascertain position, comprising a housing suitable for ejection from a retro-ejector and capable of withstanding accelerations of two hundred miles per hour in a distance of 5 feet and impact with the surface of a body of water when dropped from heights up to ten thousand feet, said housing having a part thereof of non-conductive material and enclosing a variable frequency audio oscillator, a modulator, a transmitter utilizing transistors and capable of transmitting a signal in the frequency range of 100 to 500 Mc/s, a single wire vertical antenna suitable for transmission within said frequency range and positioned within said part of said housing, a power supply to supply power to said transmitter and capable of providing a minimum of fifteen minutes of usable transmitting time, and an inertial switch to switch on said power supply, said switch being operable upon ejection of the marker or upon the marker striking a body of water after ejection.

The invention will now be described by way of example, with reference to the accompanying drawings in which.

Figures 1, 2:
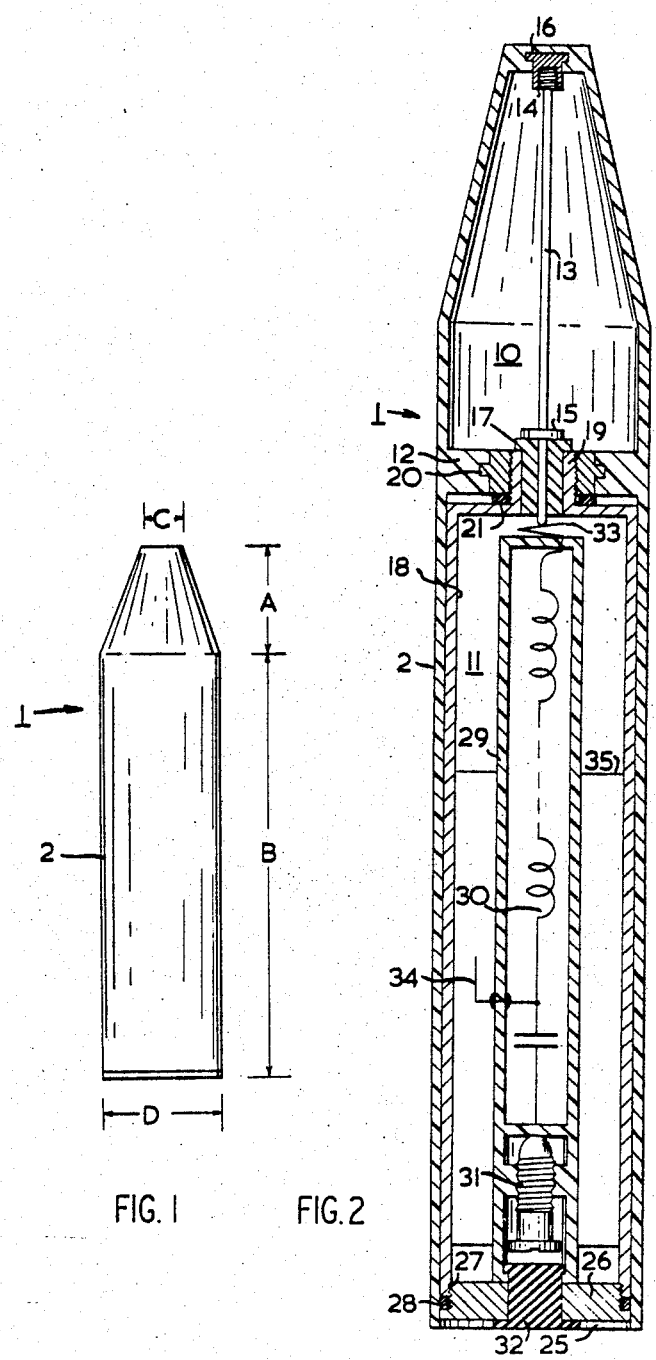
FIG. 1 is a perspective view of a marker in accordance with one embodiment of the present invention.
FIG. 2 is a sectional side view of the marker shown in FIG. 1.

Referring to the drawings and more particularly to FIG. 1 there is shown a typical marine marker 1 for use with a retro-ejector in an aircraft, (not shown). The marker apparatus is contained in a cylindrical watertight fiberglass housing 2, having an outside diameter D of approximately 2 13/16 inches tapering to a diameter C of approximately 1 inch in a distance A of approximately 3 ¾ inches. The housing has an overall length A+B of approximately 18 ½ inches. It will be appreciated that the precise construction of this marker will vary with the frequency and duration of emission, and the equipment or method used to eject, launch or dispense the marker. Hence, the description contained herein is for a specific marker operating at a specific frequency and adapted to a certain type of retro-ejector.

Referring now to FIG. 2 there is shown the arrangement of the individual components in the electronic marker. The marker 1 is divided into two principal parts or sections, the antenna section 10 and the main component section 11 separated by a fiberglass dividing member 12 forming part of the cylindrical watertight fiberglass body 2.

In the antenna section 10 there is mounted a single wire antenna 13 having a thread 14 provided at its upper end and having an integral metal shoulder 15 at a position towards its bottom end. The length of the antenna 13 is, of course, determined by the required operating conditions and it may, for example, have a length of a quarter wavelength and be between 6 and 16 inches long. To correctly locate the single wire antenna 13 the thread 14 is screwed into a metal cap nut 16 which is firmly affixed to the inner surface at the top end of marker 1 and may be embedded in the casing material. The bottom portion of the antenna is secured in an insulating member 17 so that the flange 15 of the antenna rests firmly on the top surface of the insulating member. The insulating member 17 is further secured at the center of the fiberglass dividing member 12 so that the longitudinal axis of the antenna lies substantially parallel to the longitudinal axis of the marker 1.

In the component section 11 there is provided a metal casing 18 which is secured to the fiberglass housing 2. When in position the metal casing fits flush with the inner walls of the component section of the marker. To secure the metal casing 18 to the fiberglass housing 2, a threaded collar 19 is provided at the upper end of the casing 18. A nut 20 is embedded in the fiberglass dividing member 12 to receive the collar 19 of the metal casing 18. The insulating member 17 positioned around the lower part of the single wire antenna 13 is inserted in the collar 19 thus facilitating electrical connection of the antenna from the component section 11. A gasket 21 is provided at the base of the threaded collar to better seal both sections of the marker.

All the electronic equipment necessary to operate the marker marine is located inside the metal casing 18. This equipment is supported by a cylindrical base member 25 which is threaded around its upper section 26 to cooperate with the threads 27 provided in the bottom inner wall of the metal casing 18. A gasket 28 is provided between the cylindrical base member 25 and the metal casing 18 to seal the connecting joint. Mounted at the center of the cylindrical base member 25 is a substantially elongate cylindrical housing 29 constructed of insulating material. An antenna matching circuit 30 is arranged within said insulating housing 29. In order to adjust the antenna matching circuit unit an adjusting screw 31 is provided in the base of the substantially elongate cylindrical housing. The adjusting screw 31 is accessible through a hole in the cylindrical base member 25 directly opposite the screw and sealed off by a removable watertight plug 32. To connect the antenna matching circuit 30 to the single wire quarter-wave antenna 13 a spring clip 33 is positioned on the upper face of the cylindrical housing 29 whereby contact between the spring clip and the bottom of the single wire antenna is provided when the housing 29 is in position. An input connection 34 is also provided to connect the transmitter to the antenna.

A transmitter unit 35 is provided around the antenna housing 29 and contains a transistor transmitter capable of transmitting signals within the frequency 100 to 500 Mc/s, the antenna 13 being suitably matched for those signals. The transmitter unit 35 may also contain other electronic devices, if as such AS a modulator, a variable frequency audio oscillator, a battery operated power supply, and an internal switch operable to switch on the power supply upon ejection of the marker from an aircraft's retro-ejector or upon the marker striking the sea after ejection from the retro-ejector.

It may, of course, sometimes be convenient to locate the power supply externally of the transmitter unit 35 and this can, of course, be done. The batteries and power supply should preferably be adequate to provide at least 15 minutes of usable transmitting time.

Figure 3:
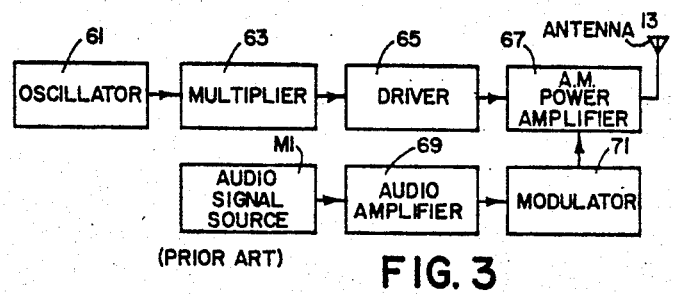
FIG. 3 is a block diagram of a prior art audio-modulated transmitter.

Merely by way of explanation, it is added that the transmitter unit 35 can be an audio-modulated transistorized unit as shown in FIG. 3, which is a prior art circuit copied from FIG. 221 on page 225 of "Department of the Army Technical Manual TM11-690" issued in March 1959 and available from the Superintendent of Documents, U.S. Government Printing Office, Washington D.C.

In FIG. 3, an oscillator 61 through a frequency multiplier 63 and a driver amplifier 65 operates audio-modulation power amplifier 67 which is connected to antenna 13. To produce audio modulation, an audio tone is applied through M1 and an audio amplifier 69 to a modulator 71 which in turn drives the power amplifier 67. The output from the antenna 13 is thus an audio-modulated radio signal. Although a carrier wave (CW) signal could be used to enable the use of radio direction finding (RDF) equipment to locate the transmitter, it is convenient to make use of the beacon homing device on the aircraft, which indicates whether the aircraft is directed towards an activated a.m. beacon, or whether it is misdirected to the left or to the right of the beacon.

Figures 4, 5:
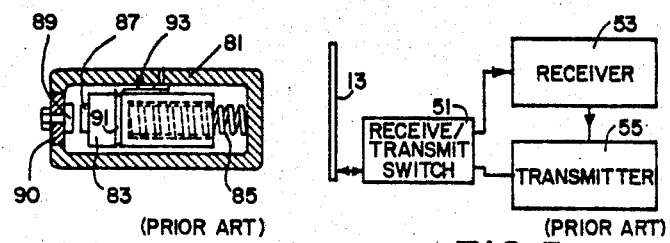
FIG. 4 is a diagram of a prior art inertial switch.
FIG. 5 is a block diagram of a prior art transponder.

FIG. 4 illustrates another prior art device; an inertial electrical switch, comprising a cylindrical housing 81 containing a cylindrical plunger 83 biassed towards the left of the housing by a compression spring 85. A first switch contact 87 is carried by the plunger, a second switch contact 89 is carried on an insulated bush 90 by the housing, and the spring 85 can hold these two contacts firmly together. However, the plunger 83 is provided with a peripheral groove 91 and a detent spring 93 carried by the housing can retain the plunger towards the right of the housing against the action of the spring. The inertial switch is mounted in the marker with its longitudinal axis parallel to the axis of the marker and with its contacts downwards (viewed as in FIG. 2). When the marker is fired from the aircraft, the inertia of the plunger enables it to overcome the restraint of the detent spring, and the contacts come together to close an electrical circuit which energizes the transmitter of the marker.

Figure 6:
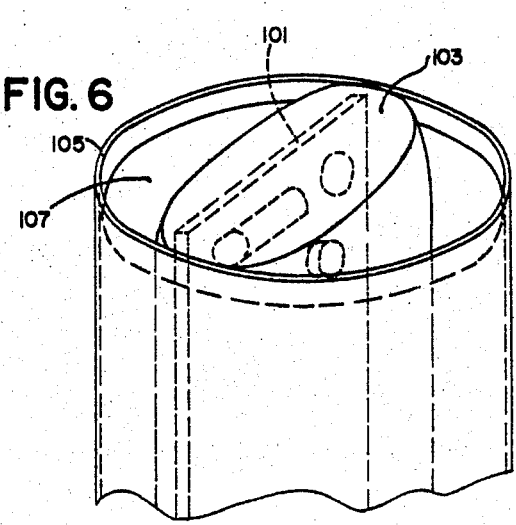
FIG. 6 is a perspective drawing showing one form of construction for a transmitter such as that shown in FIG. 3.

FIG. 6 illustrates the shock resistant construction and mounting of the transmitter unit 35. The circuit used, for example that of FIG. 3, is provided in known manner on a printed circuit board 101 which, after assembly and testing, is encapsulated or potted in known manner to provide an assembly which can withstand the high accelerations involved. Thus all the transistors, capacitors and resistors are mounted very close to the printed circuit board and their leads in orthodox manner extend through the board and are bent over on their opposite ends to provide strong mechanical anchors. These ends are of course soldered to the conductor areas on the printed board. A mass 103 of dense "potting" material is moulded over all the components and provides acceleration resistant support for the components. The "potted" board 101 is mounted in an aluminum tube 105, and the space between the mass 103 and the tube 105 is filled with firmly packed foamed plastic material 107. Finally, the tube 105 is mounted as indicated in FIG. 2 with its longitudinal axis parallel to the axis of the marker.

By such a construction, which is not claimed to be novel or the invention of the present applicant, or by the use of equivalent techniques, it is possible for a designer skilled in the art to provide a transmitter circuit which can withstand the tremendous accelerations involved in the present invention.

The remaining space in section 11 may be provided with the normal cushioning materials and also may be utilized to incorporate weights to ensure that the marker is maintained in a vertical position with the antenna uppermost when transmitting.

The marker housing 2 is, of course, preferably streamlined for minimum resistance to air currents so that high winds will not affect it and throw it off its correct course. The marker should preferably be capable of withstanding an acceleration from zero velocity to a velocity of 200 miles per hour in a distance of 5 feet and of withstanding impact with the surface of the water when dropped from a height of 10,000 feet. After landing on the water signal emitted by the marker is, of course, indicative of the position of the marker since it can be analyzed for direction and/or intensity by direction-finding equipment and thus the marked position of the submarine can be plotted on a map.

A feature which it is believed makes the described embodiment unique among the electronic devices known to the inventor is its ability to mark or indicate its release point on a surface with sufficient accuracy that a plot of the indicated positions of a series of three or four of these marking devices ejected from a moving object i.e., an aircraft, at 1-minute intervals as it passes on a series of different compass quadrantal headings directly over an object moving at a relatively slow speed (i.e., 12 knots) on or at a depth beneath the surface of water could reasonably be used to determine the horizontal displacement of the object during the period and provide an accurate reference point from which the estimated future position of the object may be plotted and located.

It will be appreciated that the particular construction of marker described above will prevent the antenna being shorted-out by waves washing over it. Such washing-over would result in intermittent transmission of signals and could provide an aircraft homing on the signals with an erroneous indication.

The combination of compactness and light weight, should permit the maximum number of markers to be carried without exceeding the aircraft's space and weight storage limitations.

The wide range of radio frequencies available will enable the user to obtain markers of frequencies or channels which are optimum for his direction finding equipment and which do not interfere with those required in the respective area for other purposes.

The invention has been described with reference to the marking of the course taken by a submarine but it will be appreciated that the use of a marker according to the invention is not restricted thereto. For example, the marker, after suitable design modifications, may conveniently be dropped on land to accurately mark a particular position, for example the place when an aircraft has crashed. The signals emitted by the marker can then be used to guide a rescue party to the crash.

Furthermore it will be appreciated that, although the marker described has been designed to operate in the frequency range 100 to 500 Mc/s, a marker may be designed in accordance with the present invention to operate at any suitable frequency or range of frequencies.

In a modification of the marker described above, a receiver function is included in the housing to control the switching on of the transmitter for a predetermined time. Thus, it could transmit only in response to an interrogating signal received, for example, from an aircraft-such a transmitter/receiver functioning in this manner is frequently referred to as a transponder.

Referring to FIG. 5, this is a block diagram showing the antenna 13, a receive/transmit switch 51, a receiver 53 and a transmitter 55. These are connected together as shown and are so arranged that normally the receive/transmit switch 51 is set to receive, and upon receipt of a suitable coded interrogation signal, the receiver 53 activates the transmitter 55 and the switch 51 is effective to permit the antenna 13 to transmit a radio signal permitting radio direction finding equipment on a ship to be used to ascertain the position of the marker. All the items shown in this Figure are well known in the art, and do not form part of the present invention. However, as mentioned previously, the equipment must be engineered to withstand the high accelerations involved in launching the marker from an aircraft with substantially zero horizontal speed relative to the ground.

In this way a marker according to the invention could be used in conjunction with TACAN - type aircraft equipment.

I claim:

1. A non-self-propelled retro-ejected device for accurately marking the instantaneous position of an aircraft relative to the surface comprising a buoyant marker including:
   a. a watertight electrically insulating protective outer casing having a lower cylindrical portion and an upper portion;
   b. a cylindrical inner metal casing adjacent the inner wall of the lower cylindrical portion of said outer casing;
   c. an elongated cylindrical metal housing located within said inner metal casing;

d. a radio transmitter interposed between said inner metal casing and said elongated cylindrical metal housing, said transmitter producing in use a signal which can be used by radio direction finding techniques to ascertain the position of the marker and adapted to withstand specified acceleration forces;

e. an antenna matching circuit positioned within said elongated cylindrical metal housing; and f. an antenna secured at both ends and centrally positioned within the upper portion of said protective outer casing, said antenna being electrically coupled to said antenna matching unit, all of the components of said device withstanding the acceleration forces involved in accelerating the casing for projection from the aircraft with a velocity component in the direction opposite to that in which the aircraft is travelling substantially equal to the forward speed of the aircraft.

2. The device defined by claim 1 wherein the upper portion of said outer casing is in the form of a truncated cone.

3. The device defined by claim 1 wherein an adjusting screw is provided in said elongated metal housing and coupled to said antenna matching circuit, said adjusting screw being accessible for adjusting said antenna matching unit.

4. A device for marking the instantaneous position of an aircraft relative to the ground according to claim 1, and in which the specified acceleration forces are those involved in accelerating the marker from rest to 200 miles per hour in a distance of 5 feet.

5. A device for marking the instantaneous position of an aircraft relative to the ground according to claim 1, and in which the specified acceleration forces are those involved in accelerating the marker from rest to 200 miles per hour in a distance of five feet and in the marker striking the surface of a body of water when the marker is dropped from heights up to 10,000 feet.

6. A device for marking the instantaneous position of an aircraft according to claim 1, and in which the marker transmitter is adapted to transmit a signal in the frequency range of 100 to 500 Mc/s.

7. A device for marking the instantaneous position of an aircraft according to claim 1, and in which the protective casing also contains:

a. batteries arranged to energize the transmitter; and b. an inertial switch which when closed connects the batteries to the transmitter;

the inertial switch being adapted to have a normal open position and a closed position to which it is set by the acceleration forces involved in projecting the marker from the aircraft.

8. A device for marking the instantaneous position of an aircraft according to claim 1, in which an upper part of the protective casing is formed of fiberglass and the antenna is disposed inside this part of the casing.

9. A device for marking the instantaneous position of an aircraft according to claim 1, in which the transmitter is adapted to transmit a signal in the frequency range of 100 to 500 Mc/s and the antenna is tunable to operate as a quarter wave vertical antenna.

10. A device for marking the instantaneous position of an aircraft according to claim 1, and in which the casing also contains a radio receiver and the radio receiver is arranged to control the transmitter in such a manner that the transmitter can transmit only in response to an interrogating signal received by the receiver.

* * * * *